Nov. 4, 1958  B. W. FRY  2,858,921
COIN APPARATUS
Filed Oct. 15, 1953  11 Sheets-Sheet 1

Benjamin W. Fry,
Inventor.
Koenig and Pope
Attorneys.

Nov. 4, 1958  B. W. FRY  2,858,921
COIN APPARATUS
Filed Oct. 15, 1953  11 Sheets-Sheet 2

Benjamin W. Fry,
Inventor.
Koenig and Pope,
Attorneys.

Nov. 4, 1958    B. W. FRY    2,858,921
COIN APPARATUS
Filed Oct. 15, 1953    11 Sheets-Sheet 3

Benjamin W. Fry,
Inventor.
Koenig and Pope,
Attorneys.

Nov. 4, 1958
B. W. FRY
2,858,921
COIN APPARATUS
Filed Oct. 15, 1953
11 Sheets-Sheet 4
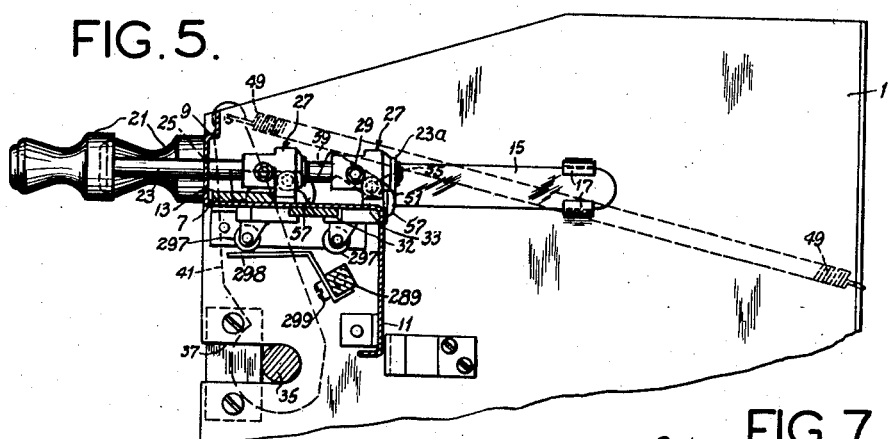
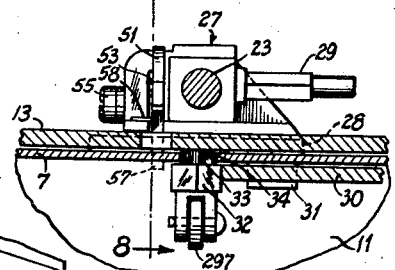
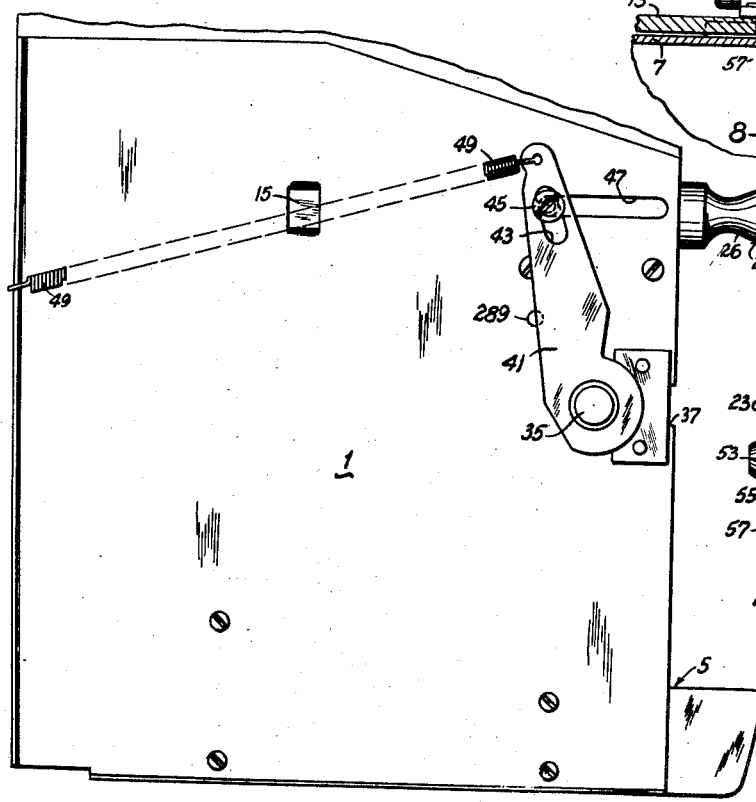
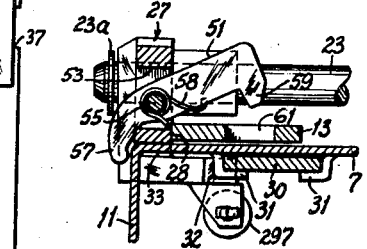

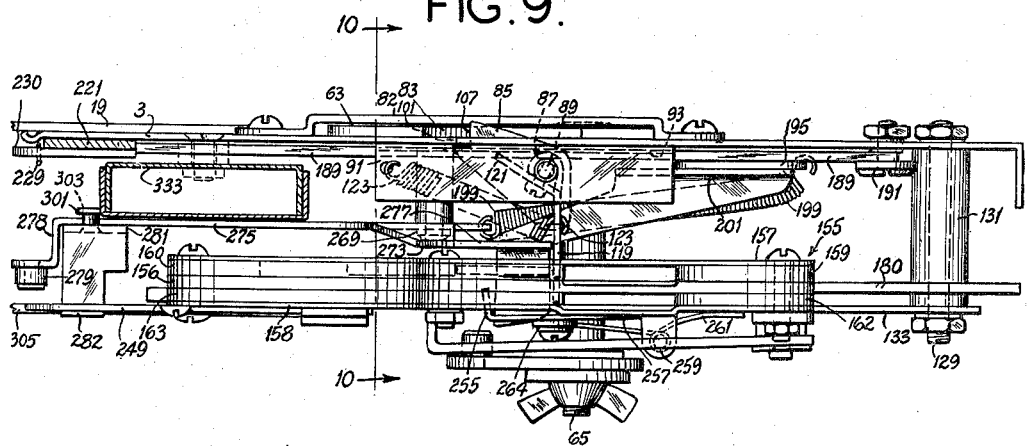
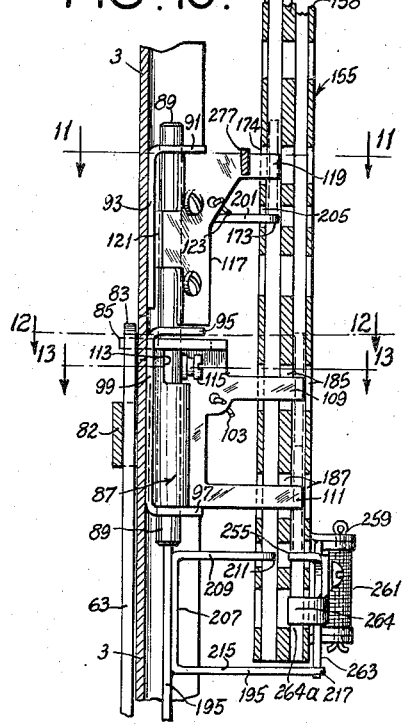
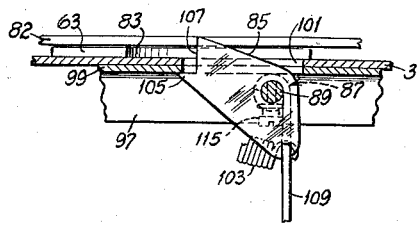
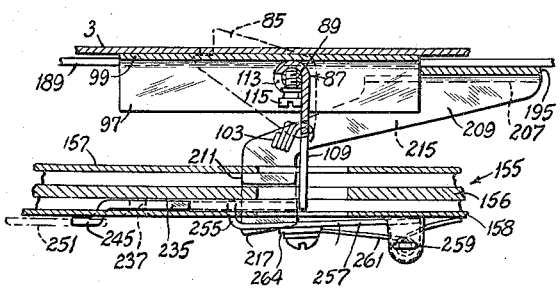

Nov. 4, 1958   B. W. FRY   2,858,921
COIN APPARATUS
Filed Oct. 15, 1953   11 Sheets-Sheet 6

Benjamin W. Fry,
Inventor.
Koenig and Pope,
Attorneys.

Nov. 4, 1958  B. W. FRY  2,858,921
COIN APPARATUS
Filed Oct. 15, 1953  11 Sheets-Sheet 7

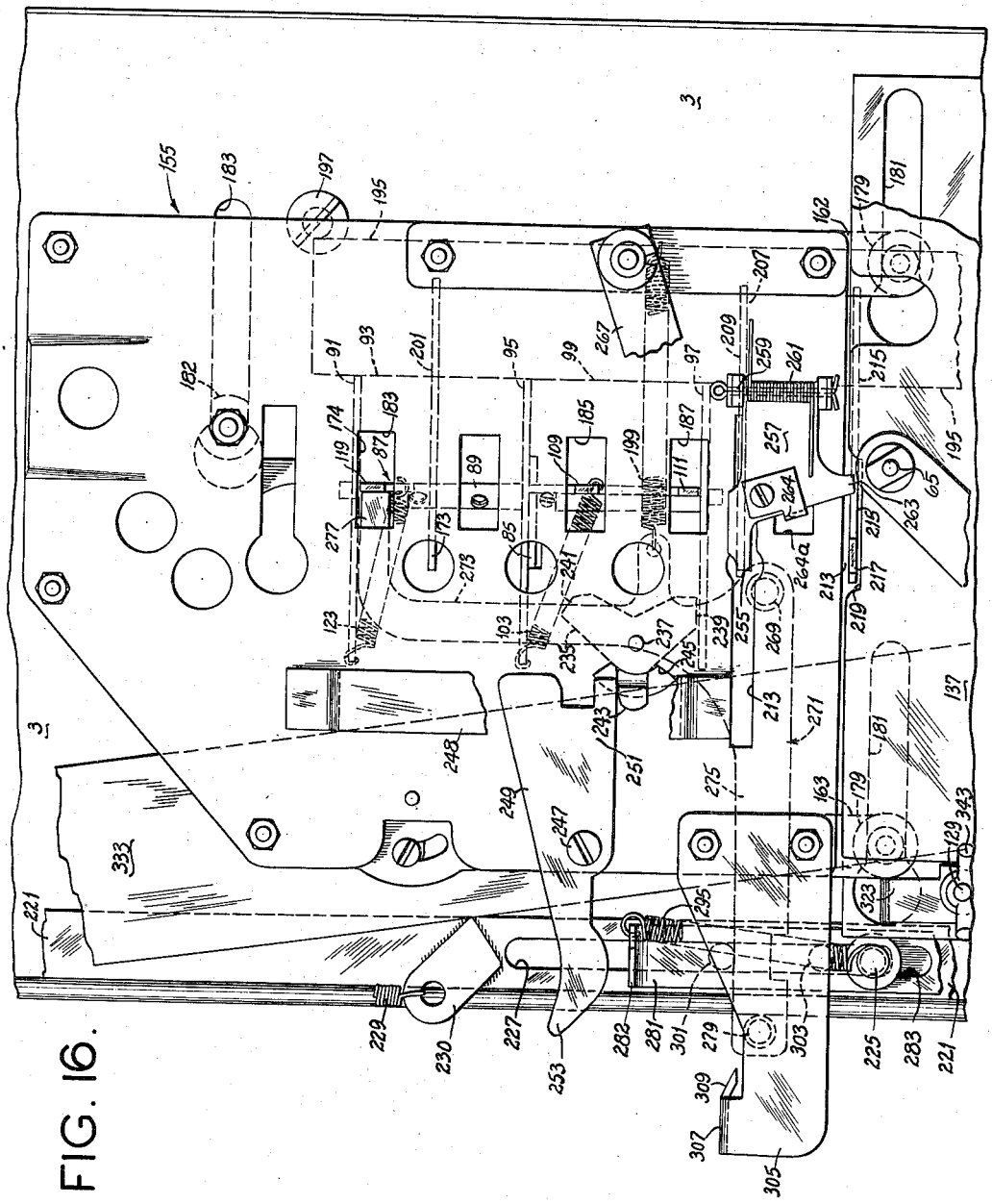

Nov. 4, 1958 B. W. FRY 2,858,921
COIN APPARATUS
Filed Oct. 15, 1953 11 Sheets-Sheet 9
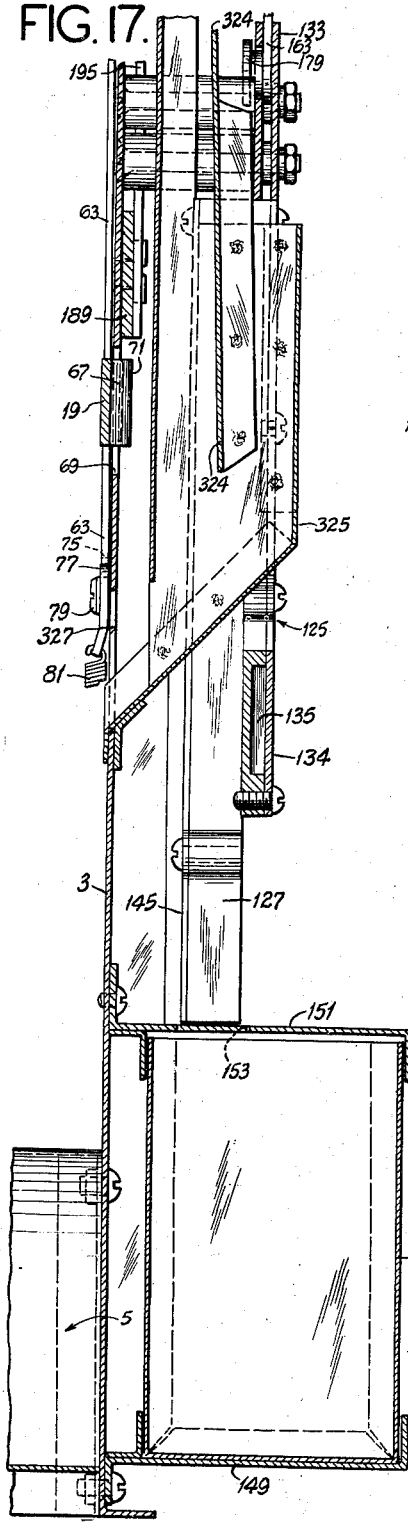
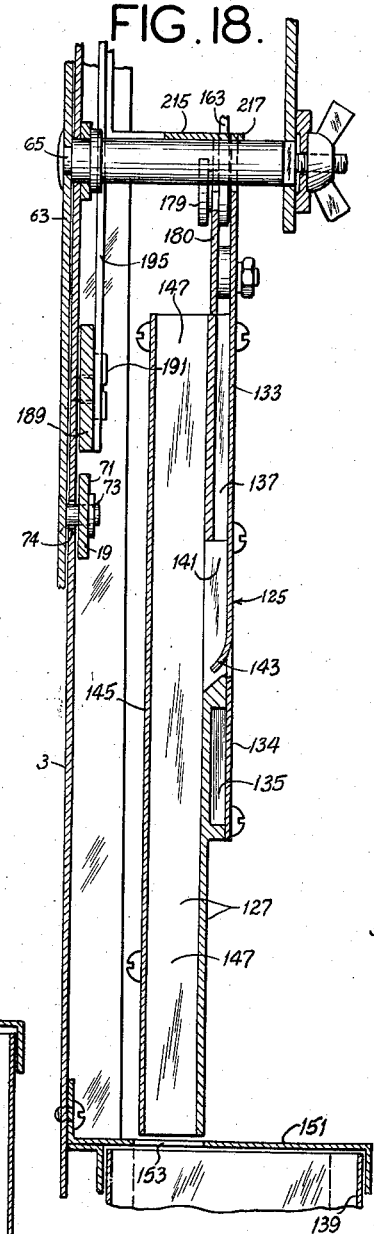
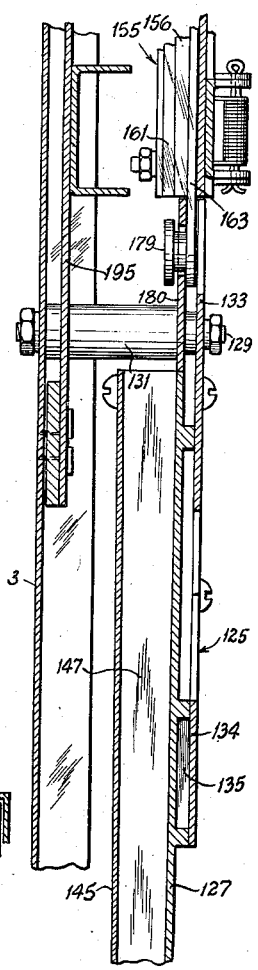
Benjamin W. Fry,
Inventor.
Koenig and Pope,
Attorneys.

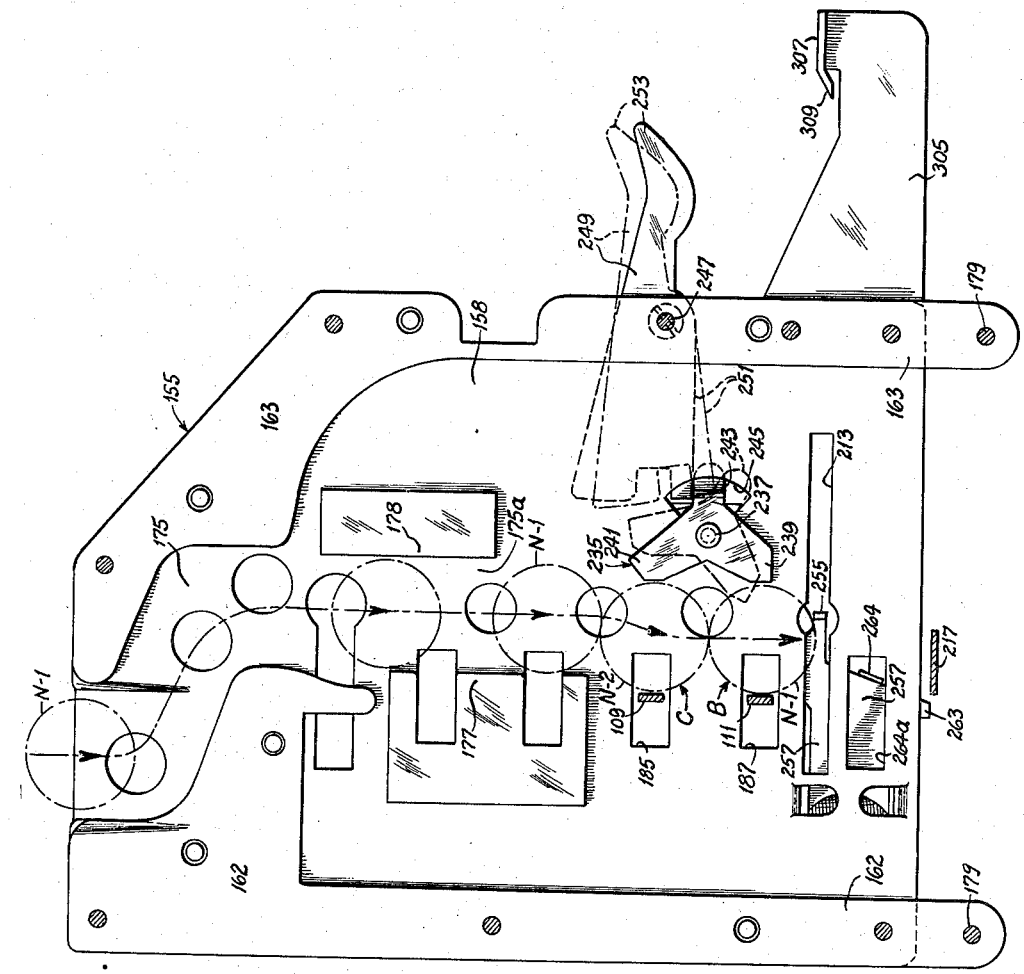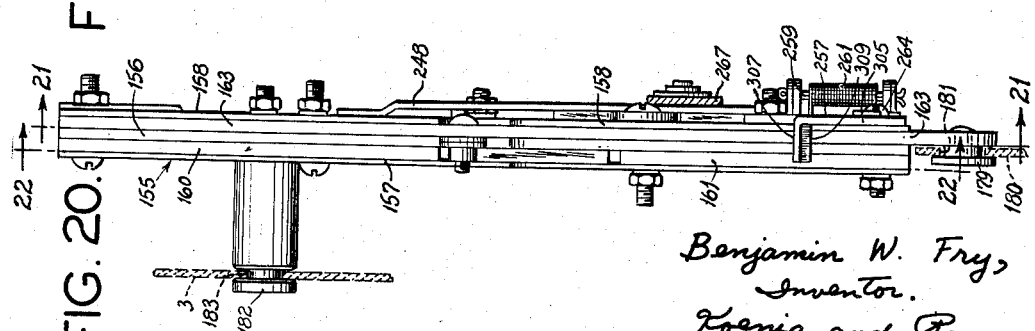

Nov. 4, 1958

B. W. FRY 2,858,921

COIN APPARATUS

Filed Oct. 15, 1953

Benjamin W. Fry,
Inventor.
Koenig and Pope,
Attorneys.

United States Patent Office 2,858,921
Patented Nov. 4, 1958

2,858,921

COIN APPARATUS

Benjamin W. Fry, Ladue, Mo., assignor, by mesne assignments, to National Vendors, Inc., a corporation of Missouri Application October 15, 1953, Serial No. 386,283

8 Claims. (Cl. 194—57)

This invention relates to coin apparatus, and more particularly to such apparatus for controlling the operation of a vending machine or the like.

Among the several objects of the invention may be noted the provision of an improved coin apparatus for controlling the operation of a vending machine or the like operable to dispense items of different prices; the provision of coin apparatus of this class which is entirely mechanical in nature, not requiring any electrical power supply; the provision of apparatus of this class for controlling the operation of a vending machine for vending a first class of items upon deposit of one coin of a first denomination (such as a United States nickel) and for vending a second class of items either upon the deposit of a second coin of this same denomination in addition to the first coin, or upon deposit of a coin of a second denomination having twice the value of the first (such as a United States dime); the provision of apparatus of this class which is adapted to issue a coin of the first denomination (for example, a United States nickel) in change upon deposit of a coin of the second denomination (for example, a United States dime) in the case of the purchase of an item of the first class; and the provision of apparatus of this class which is reliable in operation. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, Fig. 1 is a front elevation of an apparatus constructed in accordance with this invention, partly broken away;

Fig. 5 is a vertical section taken on line 5—5 of Fig. 1, showing a selector of the apparatus pulled out;

Fig. 6 is an elevation of the left side of Fig. 1;

Fig. 7 is an enlarged vertical section taken on line 7—7 of Fig. 2;

Fig. 8 is a vertical section taken on line 8—8 of Fig. 7;

Fig. 9 is an enlarged horizontal section taken on line 9—9 of Fig. 14;

Fig. 10 is a vertical cross section taken on line 10—10 of Fig. 9;

Figure 24:
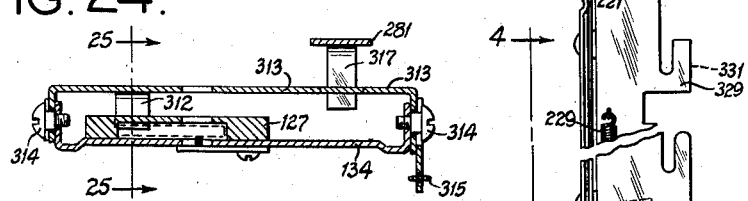
Figure 1:
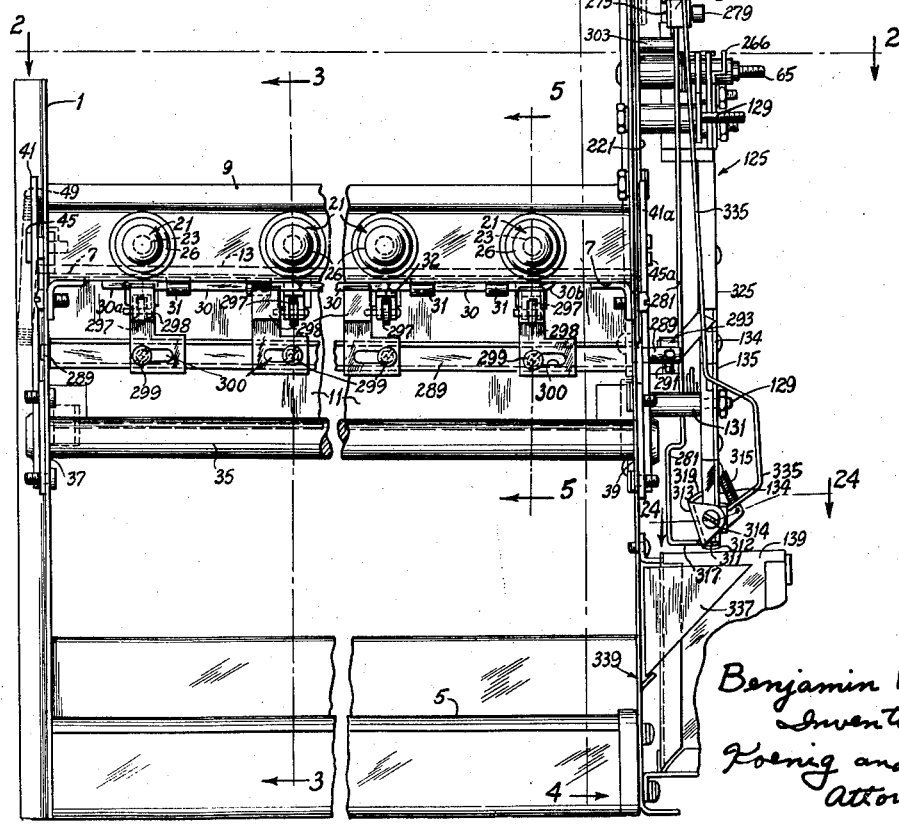
Figure 14:
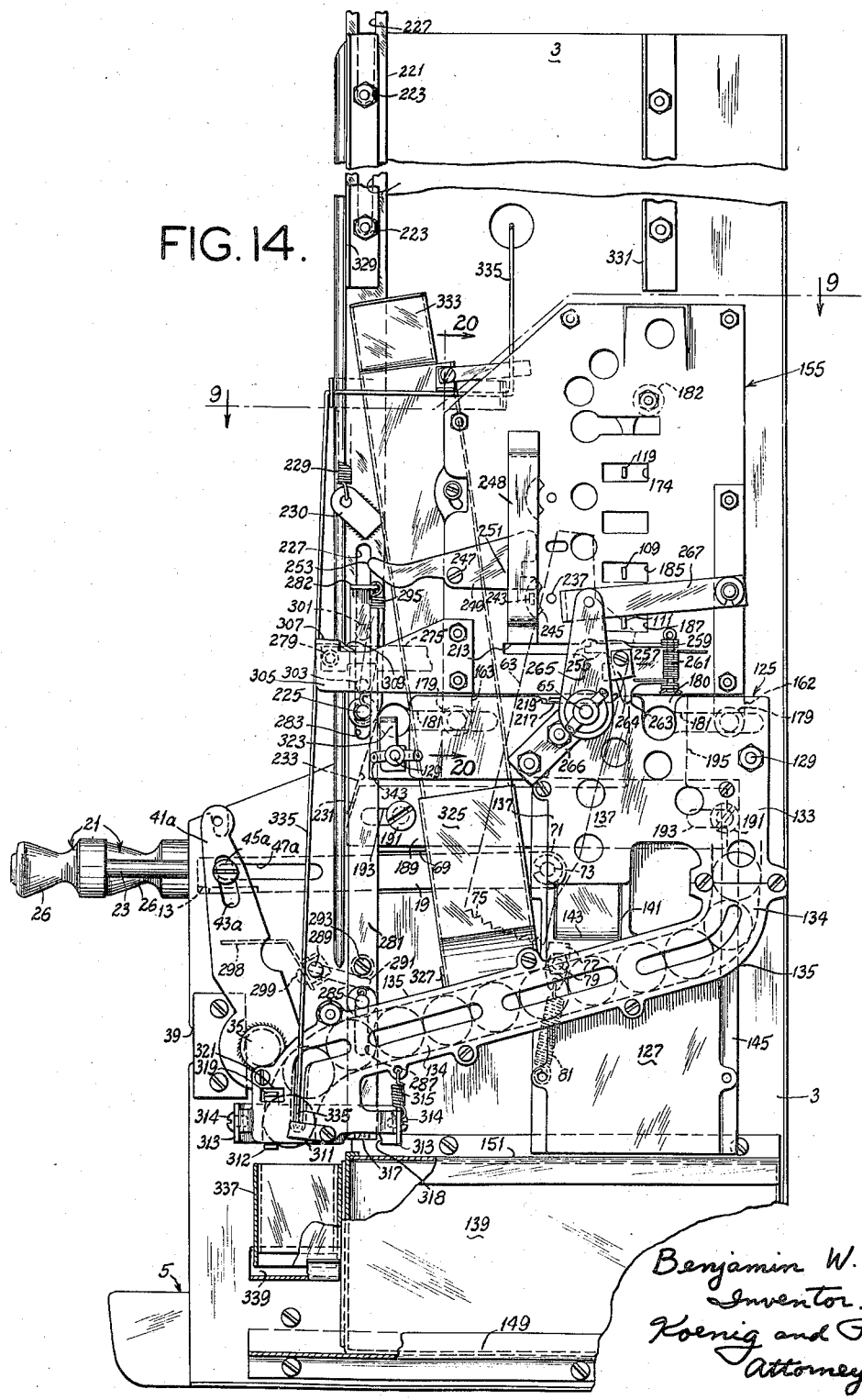
Figure 15:
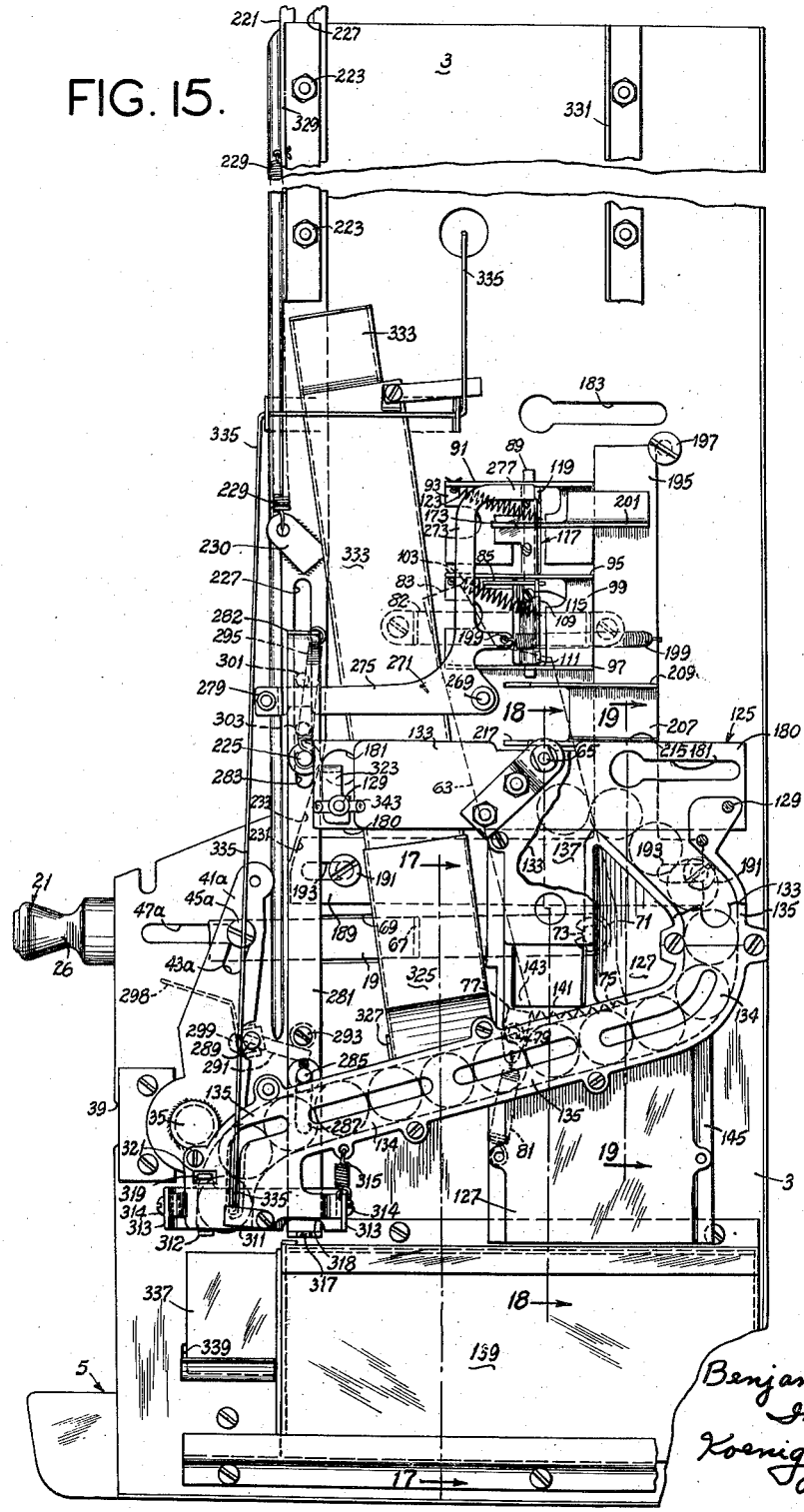
Figures 22, 23:
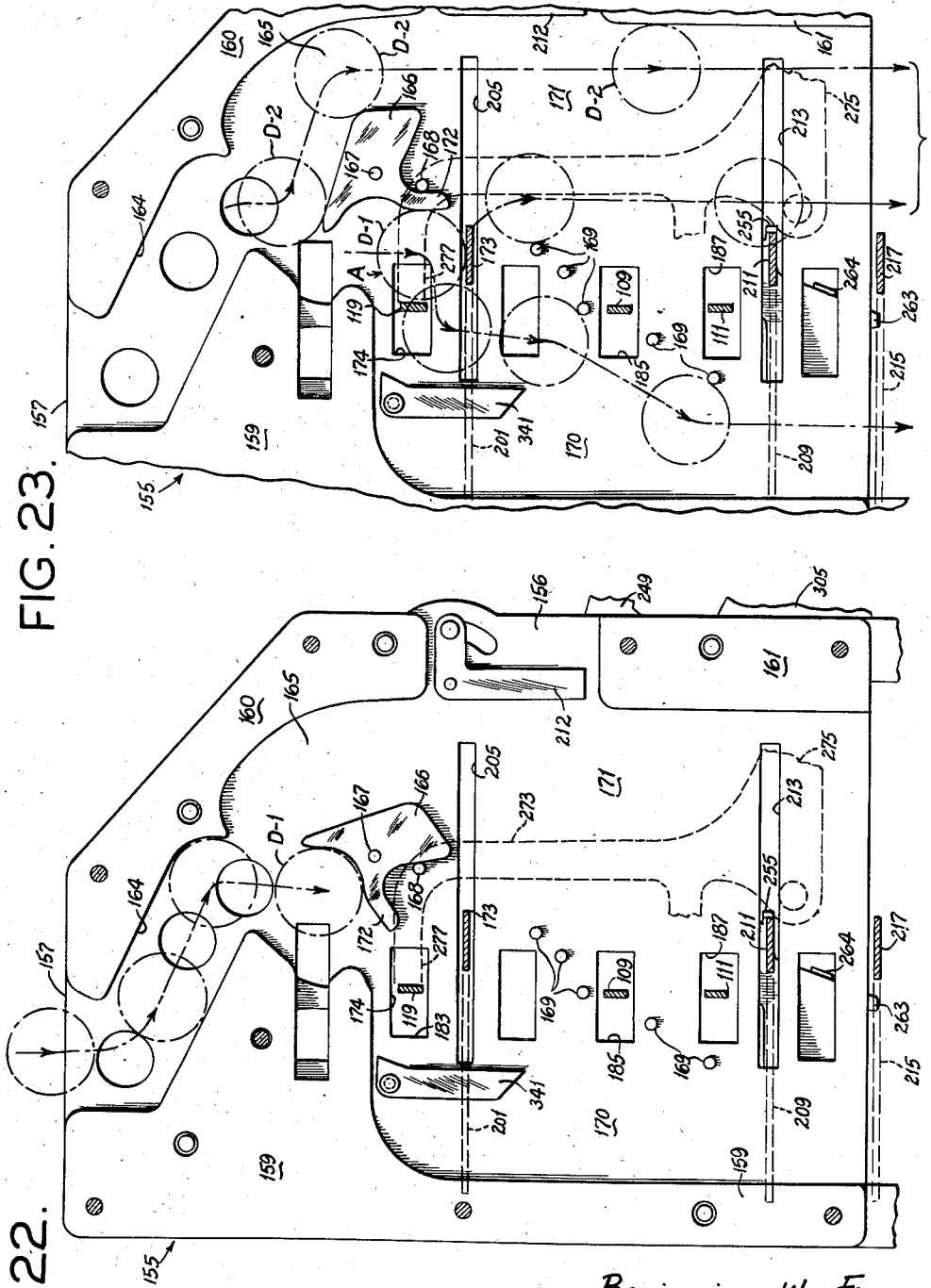

Figs. 11, 12 and 13 are horizontal cross sections taken on lines 11—11, 12—12 and 13—13 of Fig. 10, respectively;

Fig. 14 is an elevation of the right side of Fig. 1, with parts broken away and shown in section;

Fig. 15 is a view similar to Fig. 14 with certain parts removed, and other parts broken away;

Fig. 16 is an enlarged fragment of Fig. 14, with certain parts broken away and showing parts in a different position from that shown in Fig. 14;

Figs. 17, 18 and 19 are enlarged vertical cross sections taken on lines 17—17, 18—18 and 19—19 of Fig. 15, respectively;

Fig. 20 is an enlarged view taken on line 20—20 of Fig. 14;

Figs. 21 and 22 are vertical sections taken on lines 21—21 and 22—22 of Fig. 20, respectively;

Fig. 23 is a fragment of Fig. 22, illustrating a moved position of parts;

Fig. 24 is an enlarged horizontal section taken on line 24—24 of Fig. 1; and

Figure 25:
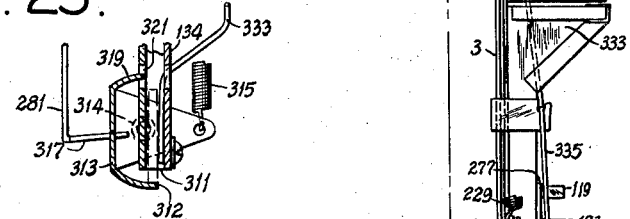

Fig. 25 is a vertical section taken on line 25—25 of Fig. 24.

Corresponding reference characters indicate corresponding parts throughout the several views of the drawings.

Figure 2:
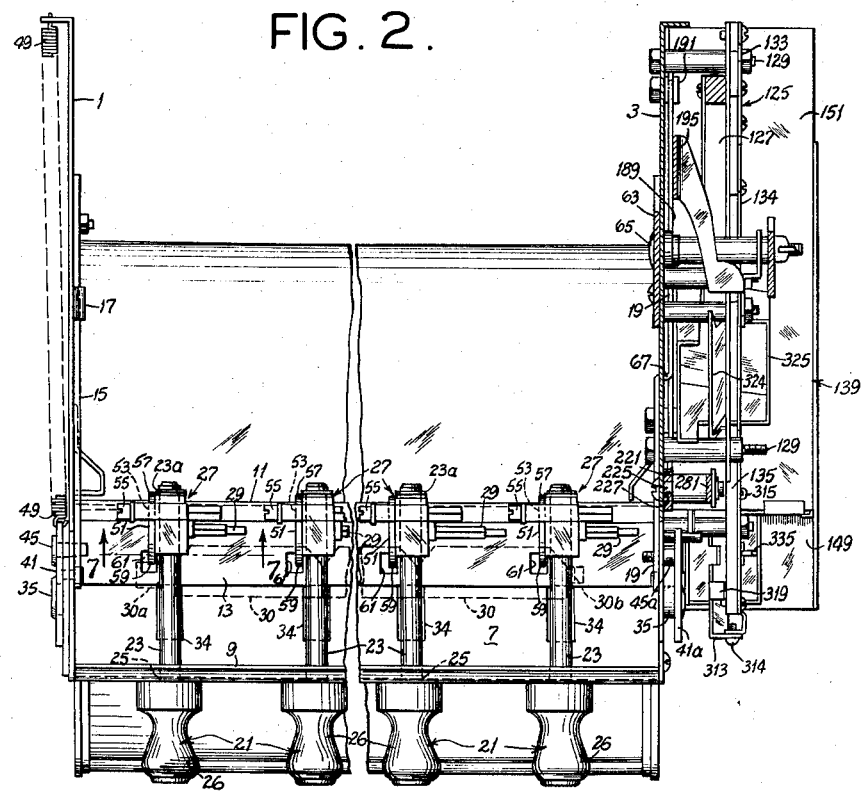
Fig. 2 is a horizontal section taken on line 2—2 of Fig. 1.

A coin receiver 155 shown in Figs. 9–11, 13, 14, 16 and 19–23 is removed from Figs. 1, 2 and 15, so that parts which would otherwise be hidden by it may be seen. Fig. 16 shows the coin receiver 155 in its normal at-rest position. As will appear, the coin receiver is movable from this at-rest position to the limit shown in Fig. 14, and back to its at-rest position.

The invention is herein disclosed as it relates to a vending machine such as is shown in my copending application entitled Vending Machine, Serial No. 280,718, filed April 5, 1952, issued as Patent No. 2,743,842 May 1, 1956. This vending machine comprises a plurality of vertical magazines arranged side-by-side, particularly for items such as bars and packages of candy. Associated with each magazine is a dispensing mechanism operable by a selector constituted by a pull-out rod. The coin apparatus of this invention is constructed to allow for utilizing some of the magazines for five-cent items and others for ten-cent items, providing for dispensing a five-cent item from any magazine of five-cent items upon deposit by the purchaser of either a nickel or a dime, issuing a nickel in change upon insertion of a dime, and for dispensing a ten-cent item from any magazine of ten-cent items upon deposit of either a dime or two nickels. It will be understood, however, that the invention is not limited to use in conjunction with the vending machine disclosed in my said copending application, nor is it limited to taking nickels and dimes, its principles being applicable to apparatus for taking coins of other denominations.

Referring first more particularly to Figs. 1–6, a coin apparatus of this invention is shown to comprise left and right side walls 1 and 3. The space between the walls is adapted to accommodate a plurality of vertical magazines arranged side-by-side, and dispensing mechanism for each magazine, as illustrated in Patent 2,743,842, and hence omitted here. A trough 5 extends between the walls 1 and 3 at the bottom of the apparatus to receive an item dispensed from any one of the magazines, as in said patent, and also to receive nickels issued in change. Extending between the side walls at the front of the apparatus above the trough is a relatively narrow fixed horizontal plate 7. This has an upwardly extending front flange 9 and a downwardly extending rear flange 11. On the plate 7 is a draw bar 13 which extends from one side wall to the other. This bar is slidable on plate 7 transversely with respect to its own length and in forward and rearward direction with respect to the apparatus. The bar 13 at its left end has a connection with a slide 15 which is horizontally slidable on the inside of the left side wall 1, being guided in ears 17 struck from the wall 1 (see Figs. 2 and 3). The bar 13 at its right-hand end has a connection with a link 19 (see Fig. 4) which will be later described in detail.

Figure 3:
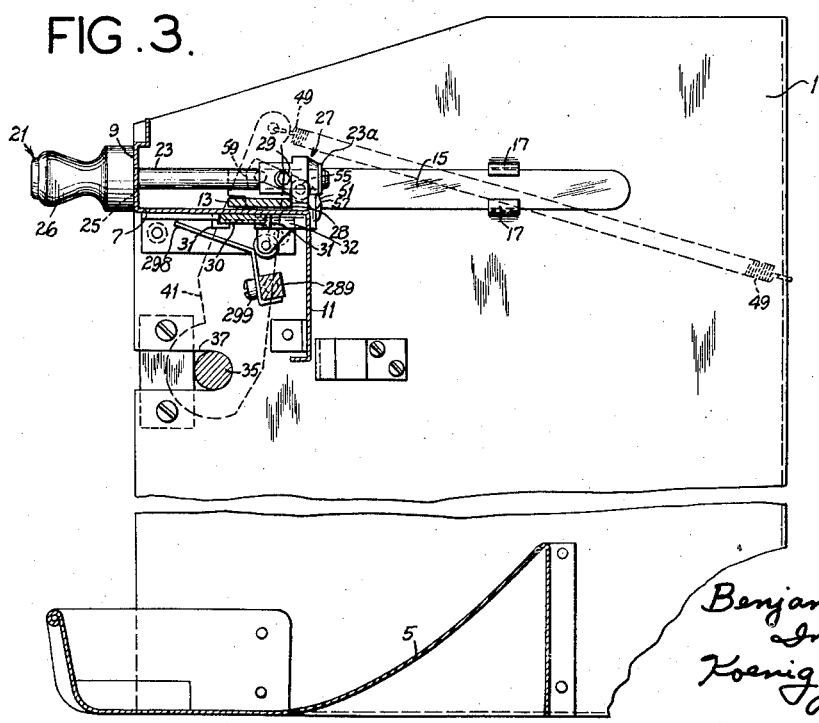
Fig. 3 is a vertical section taken on line 3—3 of Fig. 1.
Figure 4:
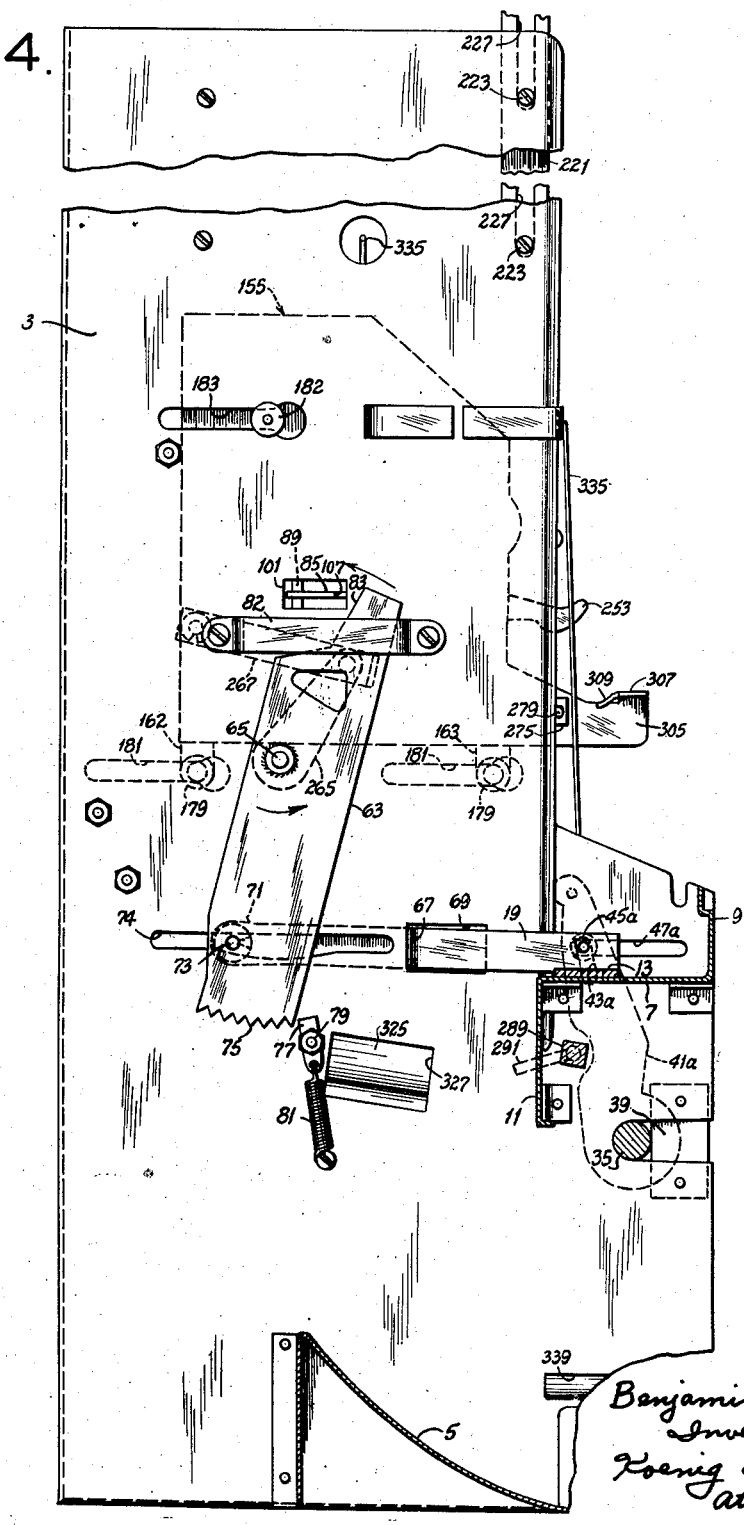
Fig. 4 is a vertical section taken on line 4—4 of Fig. 1.

The bar 13 is adapted to be moved from the rearward retracted position illustrated in Figs. 2–4 toward the front of the apparatus (toward the front flange 9 of plate 7)

by pulling out any one of a plurality of selectors each generally designated 21. Each selector comprises a pull-out rod 23 extending through an opening 25 in the flange 9 and having a knob 26 on its outer end. Each rod 23 has a head 27 at its inner end having a shoulder at 28 engaging the rearward edge of the bar 13 (see Fig. 8). There is a selector rod 23 for each magazine, and a stud 29 on each head 27 for connection of a link (not shown) to operate the dispensing mechanism of the respective magazine. Each head 27 is slidable on its respective rod 23, the rod having a collar 23a at its rearward end for engagement with the head. Lock-out means is provided to prevent pulling out more than one rod 23 at a time. This is shown to comprise a series of interlock tumblers 30 mounted to be slidable laterally under the apparatus under the plate 7 between end stops 30a and 30b. The tumblers are guided by ears 31 struck from the plate 7. Each of the heads 27 has a nose 32 at the lower end of a stem 33 which extends downward through a slot 34 in the plate (see Figs. 2, 3, 5, 7 and 8). The arrangement is such that when any one rod 23 is pulled out the nose 32 on the head 27 at its inner end spreads the entire series of tumblers apart to lock all the other rods against being pulled out. The construction of the tumblers is similar to that shown in my U. S. Patent 2,377,413, and, since the details thereof do not form a part of this invention, will not be further described.

A shaft 35 extends between the side walls below the plate 7, being journalled at its ends in openings 37 and 39 in the side walls 1 and 3, respectively. Fixed on the left end of the shaft outward of the left side wall 1 is a lever 41 (Fig. 6). This lever extends upward from the shaft and has a slot 43 receiving a stud 45 which extends from the slide 15 through a horizontal slot 47 in the left side wall. A tension spring 49 biases the lever and shaft counter-clockwise as viewed in Fig. 6. This biases the draw bar 13 rearward thereby normally holding the draw bar 13 and all the rods 23 in the rearward retracted position illustrated in Figs. 2 and 3 wherein knobs 26 engage the front flange 9 of plate 7. Fixed on the right end of the shaft 35 outward of the right side wall 3 is a lever 41a like lever 41 (see Figs. 14 and 15). Lever 41a has a slot 43a receiving a stud 45a extending from link 19 through a horizontal slot 47a in the right side wall.

Pivoted on each of the heads 27 is a latch 51 (see Figs. 2, 3, 5, 7 and 8). This latch is located in a slot 53 in the head, being pivoted on a stud 55 extending across the slot. Each latch has a downwardly extending tail 57 which reaches downward behind the rear flange 11 of the plate 7 when the respective rod 23 is in its rearward retracted position (see Figs. 3 and 8). Each latch 51 is biased to turn counterclockwise as viewed in Fig. 8 by a spring 58. When any rod 23 is pulled forward from its retracted position, the respective latch 51 is turned clockwise as viewed in Fig. 8 by the engagement of its tail 57 with the flange 11, and a downwardly extending nose 59 at the forward end of the latch engages in an opening 61 in the draw bar 13. As this occurs, the tail moves upward to ride upon the plate 7 (see Fig. 5). This holds the nose in the opening 61 to latch the rod 23 to the draw bar.

A control lever 63 is fixed on a shaft 65 rotary in the right side wall 3 (see Fig. 4). The lever is on the inside of wall 3. The shaft 65 is located above the link 19. The latter is bent at 67 to extend from the inside of the wall 3 through an elongate slot 69 in the wall 3 and has an extension 71 on the outside of the wall 3 which has a pin connection at 73 with the lever 63 below the stud 65. The pin 73 reaches through a slot 74 in the wall 3. When all the rods 23 are in retracted position, and when the draw bar 13 hence is in its rearward retracted position, the lever 63 occupies the retracted position illustrated in Fig. 4. The lower end of the lever 63 is formed with ratchet teeth as indicated at 75. At 77 is shown a latching pawl for the lever pivoted on the inside of wall 3 by means of a stud 79 and biased by a spring 81. The toothed end 75 of the lever comes into engagement with the pawl when the lever is swung counterclockwise from its retracted position as viewed in Fig. 4 to preclude return movement of the lever, unless the lever swings far enough for its toothed end 75 to move forward clear of the pawl 77. This compels full-stroke operation of any rod once it has been pulled out far enough for engagement of the teeth with the pawl. However, any rod may be pulled out a short distance before the pawl engages the teeth.

The upper end of the lever 63 above a strap 82 has a shoulder 83 adapted, upon counterclockwise movement of the lever through a small angle from its retracted position illustrated in Fig. 4, for engagement with a coin-controlled tumbler or stop 85 (see particularly Figs. 9–13). This stop comprises a horizontal plate fixed on the upper end of a hinge member 87 rotary on a vertical rod 89 located on the outside of the side wall 3. Rod 89 is journalled for rotation in openings in an upper horizontal flange 91 on an upper bracket 93 and in upper and lower flanges 95 and 97, respectively, on a lower bracket 99, the brackets being fixed on the outside of wall 3. The stop 85 is biased toward an operative position projecting through an opening 101 in the wall 3 and bracket 99 by a spring 103, this bias being clockwise as viewed in Figs. 9 and 11–13. Clockwise movement of the stop under the bias of spring 103 is limited by the engagement of a shoulder 105 on the stop with the bounding edge of the bracket 99 at the forward side of the opening 101 (see Fig. 12). This determines the operative position of the stop, in which position another shoulder 107 thereon is positioned on the inside of the wall 3 for engagement by the shoulder 83 at the upper end of the lever 63. The arrangement is such that, with the stop 85 in its operative position projecting through opening 101 as illustrated in Figs. 9–13, all the selector rods 23 are locked against being pulled out any more than the small distance corresponding to the small angle through which lever 63 may turn before its shoulder 83 engages the shoulder 107 of the stop. This small movement of the lever is not sufficient for the toothed end 75 of the lever to latch on to the pawl. In order that any rod may be completely pulled out for full-stroke operation, it is necessary that the stop 85 be retracted by counterclockwise movement from the position shown in Figs. 9 and 11–13 to position it outside of side wall 3 and out of the path of the lever 63.

The hinge member 87 has an upper arm 109 and a lower arm 111. As illustrated, the member 87 and the arms are formed in one piece from a sheet metal blank. Immediately below the stop 85, the eye of the hinge member 87 has an opening 113. A stud 115 extends radially from the rod 89 through this opening. The arrangement is such that when the rod 89 is rotated counterclockwise as viewed from above, the stud 115 engages the hinge member (see Fig. 13) to turn the stop 85 counterclockwise and move it from its operative to a retracted position. On the other hand, noting that the assembly of the stop and hinge member is rotary on the rod 89, it can be turned counterclockwise as viewed from above independently of the rod 89 away from the stud 115.

The assembly of the stop and hinge member is mounted on the lower part of the rod 89 between the flanges 95 and 97 of the lower bracket 99. Fixed on the upper part of the rod 89 between the flange 95 and the flange 91 of the upper bracket 93 is a member 117 having an arm 119 projecting toward the right away from the side wall 3, and an arm 121 engageable with the outside of the bracket 93 to determine an operative position of the member 117 and rod 89 in which stud 115 is so positioned that the stop 85 may take its operative position under the bias of spring 103. A spring 123 biases the member 117 clockwise as viewed from above toward the said operative position. With stop 85 and member 117 in operative position, the arms 109, 111 and 119 are all generally in vertical alignment projecting toward the right outward from the side wall 3. Arm 119 is shorter than arms 109 and 111.

Mounted on the outside of the side wall 3 below the lower bracket 99 is a fixed lower coin chute assembly, generally designated 125. As shown best in Figs. 14, 15 and 17–19, this comprises a central plate 127 which is held spaced from and parallel to the side wall 3 by means of bolts 129 and spacers 131. The outside face of the central plate 127 is formed to provide, in conjunction with outer plates 133 and 134, a magazine 135 for nickels, in which nickels are retained edge-to-edge, and an overflow chute 137 for passage of nickels to a coin box 139 when the nickel magazine is full of nickels. The central plate 127 has an opening 141 at the lower end of the overflow chute (see Fig. 18), and the outer plate 133 has a curved tongue 143 which extends inwardly through the opening. The inside face of the central plate 127 is formed to provide, in conjunction with an inner plate 145, an inside chute 147 open at its lower end for coins to fall into the coin box. The arrangement is such that nickels dropping in the overflow chute 137 are deflected by the tongue 143 through the opening 141 into the inside chute 147, and thence fall into the coin box. The coin box is slidable on a shelf 149 mounted on the outside of the side wall 3 adjacent its bottom. A top guide plate for the coin box is shown at 151. Guide plate 151 has an opening 153 aligned with the inside chute 147.

A coin receiver, generally designated 155, is slidable forward and rearward above the lower coin chute assembly 125. This coin receiver, which appears in Figs. 9–11, 13, 14, 16 and 20–23, comprises a central plate 156 sandwiched between plates 157 and 158, with spacers 159, 160 and 161 between plates 156 and 157 and spacers 162 and 163 between 156 and 158. Plate 157 is located toward side wall 3. Plates 156 and 157 in conjunction with spacers 159 and 160 define an inclined dime chute 164 having an entrance at the upper end of the receiver 155 and leading to a wide chute section 165 (see Figs. 22 and 23). A dime deflector 166 is pivoted at 167 in chute section 165. This deflector is normally gravity-biased to the position shown in Fig. 22, determined by its engagement with a pin 168. Below the deflector, the space between plates 156 and 157 is divided by a series of pins 169 into two dime chutes 170 and 171. The deflector is so shaped that, when in its normal position illustrated in Fig. 22, it intercepts a first dime D-1 exiting from chute 164, then swings counterclockwise on its pivot as viewed in Fig. 22 under the overbalancing weight of the dime to the deflecting position, illustrated in Fig. 23, determined by the engagement of an arm 172 on the deflector with the pin 168. The intercepted dime D-1, upon the stated swinging of the deflector, rolls down arm 172 to a position designated A in Fig. 23 resting on a dime support 173 and lodged between the arm 172 and the arm 119. The arm 119 reaches into the space between plates 156 and 157 through an opening 174 (see Figs. 10, 22 and 23). With the deflector in its Fig. 23 deflecting position, if a second dime D-2 should be deposited in chute 164, it is deflected by the deflector into the chute 171 (see the successive positions of dime D-2 indicated in Fig. 23), and will drop out of the coin receiver.

Plates 156 and 158 in conjunction with the upper portions of spacers 162 and 163 define an inclined nickel chute 175 having an entrance at the upper end of receiver 155 and leading to a vertical nickel chute 175a defined by plates 177 and 178 fixed on the inside of plate 158 (see Fig. 21). Spacers 162 and 163 have portions which extend below the assembly of plates 156, 157 and 158 at the bottom corners of the assembly and which carry headed studs 179. The outer plate 133 of the lower coin chute assembly extends above the top of the central plate 127 (see Figs. 17–19). A plate 180 is fixed on the inside of the upper portion of the plate 133 on top of the central plate 127, being spaced from plate 133 somewhat more than the thickness of a nickel. This plate 180 is carried by certain of the bolts 129. It has a pair of horizontal keyhole slots 181 which receive the headed studs 179. The coin receiver 155 also has a grooved stud 182 which is slidable in a horizontal keyhole slot 183 in the right-hand side wall 3 above the upper bracket 93. The receiver 155 has the previously mentioned opening 174 in the form of a horizontal slot accepting the arm 119, a horizontal slot 185 accepting the arm 109, and a horizontal slot 187 accepting the arm 111. Arms 109 and 111 reach into the space between plates 156 and 158.

A slide 189 is mounted for horizontal forward and rearward movement on the outside of the right-hand side wall 3 and inside the lower coin chute assembly 125 by means of studs 191 fastened to the side wall 3 and received in horizontal slots 193 in the slide 189 (see Figs. 15 and 17–19). Fastened to this slide 189 toward its rearward end is a plate 195 which extends vertically upward in the rear of the brackets 93 and 99. The upper edge of the plate 195 is guided in a groove in the head of a stud 197 carried by wall 3. The assembly consisting of slide 189 and plate 195 is biased forward by a spring 199 to a forward position determined by engagement of the forward edge of the plate 195 with the rearward edges of brackets 93 and 99 (see Fig. 15). A bracket 201 is fixed to the plate 195. This bracket extends forward from the plate 195, and at its forward end has the previously mentioned dime support 173, this support extending into the space between plates 156 and 157 via an elongate horizontal slot 205 in the plates 157 and 156 (but not across the space between plates 156 and 185). This slot 205 is located immediately under the opening 174 which accepts the arm 119. Another bracket 207 is fixed to the plate 195 below the bracket 201. This bracket 207 has an upper horizontal flange 209 which extends forward and has at its forward end a second dime support 211. This second dime support 211 extends through an elongate horizontal slot 213 in the coin receiver across the space between plates 157 and 156, but not across the space between plates 156 and 158. The slot 213, however, extends through all three plates 156, 157 and 158. It is located immediately below the slot 187 which accepts the arm 111. The second dime support 211 is provided for the purpose of adapting the apparatus for taking two dimes, in conjunction with an adjustable deflector 212. Details of this adaptation will not be described, since they are not material to an understanding of the present invention. The bracket 207 also has a forwardly extending lower flange 215 which is formed at its forward end as a cam 217 reaching under the coin receiver 155 and operating in a notch 219 in the top of plates 133 and 180.

The assembly consisting of slide 189, plate 195 and brackets 201 and 207 is adapted to be moved rearward by a coin return bar 221. This bar is mounted for vertical movement toward the forward edge of the side wall 3 by means of two upper studs 223 and a lower stud 225 fastened to the wall 3 and extending through elongate vertical slots 227 in the bar (see Figs. 14–16). The bar is biased upward to a retracted position, determined by engagement by the lower ends of the slots 227 with the studs 223 and 225, by means of a spring 229 connected to a lug 230 on the bar. The forward end of the slide 189 is inclined as indicated at 231 for engagement by an inclined camming end 233 at the lower end of the bar 221. The arrangement is such that, when the bar 221 is moved downward, the assembly comprising slide 189, plate 195, and the brackets 201 and 207 bearing the dime support 173 and the cam 217, is moved rearward.

A nickel pusher generally designated 235 is mounted for rocking movement on a stud 237 in the space between plates 156 and 158 of coin receiver 155 forward of the slots 185 and 187 (see Fig. 21). The pusher comprises a rocker having a lower arm 239 angled downward in the direction toward the rear of the coin receiver (toward the left as viewed in Fig. 21) and an upper arm 241 angled upward toward the rear of the coin receiver. The pusher, forward of its pivot 237, has a tail 243 bent to extend through an arcuate slot 245 in the outer plate 158 of coin receiver 155 to the outside of this plate. Pivoted at 247 on the outside of the plate 158 under a strap 248 is a lever 249. This lever 249 has a portion 251 extending rearward from its pivot 247 which bears on the top of the tail 243, and a portion 253 extending forward from the pivot beyond the forward edge of the coin receiver. The rearwardly extending portion 251 of the lever 249 is heavier than the portion 253 so that the lever 249 acts to gravity-bias the pusher or rocker 235 to rock clockwise on its pivot 237 as viewed in Fig. 21. When there is no nickel in the coin receiver, the pusher or rocker 235 occupies the retracted position illustrated in dot-dash lines in Fig. 21, determined by engagement of the tail 243 with the lower end of the arcuate slot 245, and lever 249 occupies the retracted position illustrated in dot-dash lines in Fig. 21 wherein its outer end 253 is raised. When a nickel N-1 is deposited in the nickel chute 175 of the coin receiver, it falls as indicated by the arrows in Fig. 21 until it comes to rest in chute 175a near the bottom of the receiver in a position designated B on a finger 255. Finger 255 is part of a plate 257 pivoted as indicated at 259 for swinging movement on a vertical axis on the outside of and adjacent the rear of the coin receiver 155. The finger 255 is adapted to project into the space between plates 156 and 158 through the slot 213. The plate 257 and the finger 255 are biased by a spring 261 toward an operative position wherein the finger 255 reaches through the slot 213 (see Figs. 10 and 13). The plate 257 also has a finger 263 engageable by the cam 217 when the assembly comprising slide 189, plate 195 and bracket 207 is moved rearward for swinging the finger 255 out of the space between plates 156 and 158. The plate 257 also carries an adjustable nickel bounce 264 which reaches into the space between plates 156 and 158 through a hole 264a in the coin receiver when the plate 257 is in its stated operative position.

When the pusher or rocker 235 is in its retracted position shown in dot-dash lines in Fig. 21, its upper arm 241 is directed substantially vertically upward, and its lower arm 239 reaches across the path of he nickel N-1 falling in chute 175a. Thus, as the nickel N-1 falls to the position B, it strikes the arm 239 and rocks the pusher counterclockwise as viewed in Fig. 21 to its operative position shown therein in solid lines. The pusher is also shown in this operative position in Fig. 16. Fig. 16 and 21 also show the lever 249 in its operative generally horizontal position corresponding to the operative position of the pusher. The nickel N-1 in position B holds the pusher and lever 249 in their operative position, the nickel being located between the end of the lower arm 239 of pusher 235 and the arm 111. A second nickel N-2 deposited in chute 175 comes to rest in chute 175a in a position designated C on top of the first nickel N-1 and in edge-to-edge contact therewith. The nickel N-2 in position C is located between the end of the upper arm 241 of pusher 235 and the arm 109. If a third nickel should be deposited in chute 175, it will be deflected toward the right as viewed in Fig. 21 under the lower end of plate 178 over the pusher and will drop out of the coin receiver on the right side of the pusher as viewed in Fig. 21. This is the forward side of the pusher.

The coin receiver 155 is coupled to the shaft 65 for rearward and forward movement via lever 63 when any one of the selector rods 23 is pulled out from and returned to its retracted position. As shown, the coupling comprises a crank 265 fixed on the outer end of the shaft 65 outward of a shaft bearing bracket 266 fixed to the outside of plate 133, and a link 267 connecting the crank and the coin receiver. Upon pulling out a rod 23, with resultant clockwise rotation of lever 63 and shaft 65 as viewed in Fig. 14, the coin receiver is driven rearward from its retracted position illustrated in Fig. 16. Fig. 14 shows the coin receiver in its ultimate rearward position, determined by engagement of the draw bar 13 with flange 9 of plate 7. Upon return of the rod, the coin receiver moves forward to return to its retracted position.

Pivoted at 269 on the outside of side wall 3 (and between wall 3 and the coin receiver 155) is a bell crank lever 271 having an upwardly extending arm 273 and a forwardly extending arm 275 (see Figs. 15 and 16). The upwardly extending arm 273 has a rearwardly extending finger 277 engageable with the arm 119. The spring 199 is connected between the plate 195 and the arm 273 to bias the lever 271 clockwise as viewed in Figs. 15 and 16. The forward end of the forwardly extending arm 275 of the lever 271 is bent as indicated at 278 (see Fig. 9) and carries a cam follower roll 279.

A bar 281 is mounted for vertical movement outside the arm 275 of lever 271. Bar 281 has a finger 282 at its upper end adapted to engage the bottom of the forward end 253 of lever 249. This mounting is effected by means of the previously mentioned stud 225 extending through a vertical slot 283 in the bar 281, and by means of another stud 285 extending through a lower vertical slot 287 in the bar 281 (see Figs. 14 and 15). A rock shaft 289 is journalled at its ends in the side walls 1 and 3 below the plate 7 (see Figs. 1, 3, 4, 5, 14 and 15). On the right end of this shaft, outward of the side wall 3 is a crank 291 which is engageable with the bottom of a sud 293 fastened to the bar 281 on the inside of the bar. The latter is biased downward by a return spring 295 to a retracted position determined by the engagement of the upper ends of slots 283 and 287 with studs 225 and 285. When the shaft 289 is rotated counterclockwise as viewed in Figs. 14 and 15 from the right side of the apparatus, the bar 281 is raised against the bias of the return spring 295. The shaft 289 is adapted to be rocked counterclockwise when any one of selector rods 23 for dispensing a five-cent item is pulled out, but remains at rest when any selector rod 23 for dispensing a ten-cent item is pulled out. This action is effected by providing each selector rod head 27 with a roller 297 on the bottom of its nose 32. In the case of those selector rods 23 which, when pulled out, are to dispense a five-cent item, the rollers 297 on the heads of the respective rods 23 are engageable with arms 298 on the shaft 289 (see Figs. 1, 3 and 5) to rock the shaft counterclockwise as viewed from the right of the apparatus. For convenience, an arm 298 is provided for every one of the rods 23, but as to those rods 23 for dispensing ten-cent items, the arms 298 are fixed on the shaft 289 to lie out of the path of the respective rollers. This makes it possible to utilize any of the rods 23 for either five-cent or ten-cent items, as desired. As shown best in Figs. 1, 3 and 5, shaft 289 is made of square cross-section, and arms 298 are attached to the shaft by set screws 299 threaded in holes in the shaft and extending through elongate slots 300 in the bases of the arms, allowing the arms to be shifted on the shaft either into or out of position for engagement by rollers 297. Fig. 1 shows the two outer arms 298 positioned for engagement by the respective rollers 297 and the two inner arms 298 clear of the respective rollers 297. Thus the two outer selector rods 23 are five-cent rods, and the two inner rods 23 are ten-cent rods.

The vertically shiftable bar 281 has a stud 301 above the arm 275 of the lever 271 and a stud 303 below the arm 275. Spring 199 biases the lever 271 toward engagement of its arm 275 with the bottom of stud 301. The tension of spring 199, however, is insufficient to overcome the tension of the return spring 295 for bar 281 and hence, when the bar 281 is in its lowered retracted position, the lever 271 is positioned as shown in Figs. 15 and 16. Carried by the coin receiver 155 for movement therewith is a change-making cam plate 305 (see Fig. 16). This extends forward from the coin receiver and at its forward end has an inturned flange 307 provided with a cam 309 inclined downward toward the rear of the apparatus. This cam is adapted for engagement under the cam follower roll 279 on arm 275 of lever 271, under circumstances in which change is to be issued, as will be made clear. Under circumstances in which change is not to be issued, the cam 309 simply passes over the top of the roll 279 when the coin receiver 155 moves rearward.

The lower end of the nickel magazine 135 is indicated at 311 (see Figs. 1, 14, 15 and 25). This is normally blocked by a finger 312 on a gate 313 pivoted as indicated at 314 on plate 134 and biased to closed position by a spring 315. The bar 281 has a finger 317 at its lower end for engagement with the gate to swing it to open position when the bar 281 is raised by the action of cam 309 on the roll 279 of the lever 271 and the resultant action of arm 275 of lever 271 on the stud 301. However, crank 291 cannot raise the bar 281 enough to open the gate. This is because the gate has a notch 318 accepting the finger 317 (see Figs. 14 and 15) and allowing the finger to rise with bar 281 when the latter is raised by crank 291 without operating the gate. Fig. 14 shows the bar 281 and finger 317 as raised by the crank 291. To open the gate, bar 281 and finger 317 are raised farther from the Fig. 14 position by the stated action of cam 309. The gate carries a detent 319 which enters a slot 321 in the magazine when the gate is opened so that only one nickel drops out of the magazine at a time when the bar 281 is raised.

The coin receiver normally occupies the forward retracted position illustrated in Fig. 16 determined by the engagement of the downward extension of spacer 163 with a stop indicated at 323. When the coin receiver is in this retracted position, and the assembly comprising slide 189 and plate 195 is moved rearward by pushing down the coin return bar 221, thereby moving the dime support 173 and cam 217 rearward, any dime in position A and any nickels in positions B and C in the receiver will be released to drop out of the receiver. As to release of the dime, the action is such that when dime support 173 has moved rearward (to the left as viewed in Fig. 23) far enough for the dime to escape over the right edge of support 173 as viewed in Fig. 23, the dime passes between the end of arm 172 of the deflector 166 and the uppermost pin of the series of pins 169 into the chute 171 and out of the bottom of the receiver 155. Thence it falls between a slightly inclined plate 324 and the plate 180 into a coin return chute 325 which conducts it through an opening 327 in the side wall 3 to the trough 5 (see Figs. 4, 14, 15 and 17). As to the release of a nickel (or nickels), the action is such that when the cam 217 has moved rearward (to the left as viewed in Fig. 21) a predetermined distance, finger 255 is swung away from under the nickel N–1 by the cam, whereupon the nickel N–1 (and a nickel N–2, if present) drops out of the bottom of receiver 155, bounding off the forward edge of the cam to fall between plates 133 and 180 into chute 325 for return to the customer.

It will be understood that the vending machine will have a coin slot for both nickels and dimes. Coins deposited in this slot will enter a coin selector and slug rejector (not shown) for delivering a nickel to the nickel chute 175 of the coin receiver 155 and for delivering a dime to the dime chute 164 of the receiver when the receiver is in its retracted position shown in Fig. 16. Brackets for mounting the coin selector and slug rejector device are indicated at 329 and 331. The coin selector and slug rejector device rejects coins of improper denominations and spurious coins. Such rejected coins drop out of the device into an upward extension 333 of chute 325. Coin selector and slug rejector devices suitable for the purpose are known; see, for example, my U. S. Patent 2,292,628. In case there are no nickels in the nickel magazine 135, a control rod 335 which is controlled by nickels in the nickel magazine by-passes coins from the coin selector and slug rejector device to the chute 333 in known manner for return to the customer. A nickel discharged from the nickel magazine in change falls into a chute 337 attached to the front of the coin box for delivery through an opening 339 in the side wall 3 to the trough 5.

Operation is as follows:

Assuming that a purchaser deposits a nickel N–1 in the coin slot of the machine for the purchase of a five-cent item, the nickel is delivered to the nickel chute 175 of the coin receiver 155. The nickel rolls down chute 175 and then falls in chute 175a until it is arrested by finger 255 in position B (Fig. 21), wherein it is lodged between the arm 111 and the end of the lower arm 239 of the pusher or rocker 235. As the nickel N–1 falls to this position, it rocks pusher 235 from its retracted position shown in dot-dash lines in Fig. 21 to its operative position shown in solid lines in Fig. 21 (and in dotted lines in Fig. 16). The result of this is that the lever 249 is rocked clockwise as viewed in Fig. 21 from its retracted position shown in dot-dash lines in Fig. 21 to its operative position shown in Fig. 16. As the lever 249 rocks to its operative position, its outer end 253 approaches the finger 282 at the upper end of bar 281.

Now assuming that the purchaser pulls out a five-cent selector rod 23 (such as the rod nearest side wall 3), the draw bar 13 is moved forward, thus pulling link 19 forward and rocking the lever 63 counterclockwise from its retracted position as seen in Fig. 4. The lever shaft 65 rotates clockwise as viewed in Fig. 14 and acts through crank 265 and link 267 to move the coin receiver 155 rearward. Pusher 235 moves rearward with the coin receiver. Pulling out the five-cent selector rod 23 rocks the shaft 289, as previously described, and crank 291 on the shaft engages stud 293 on bar 281 and raises bar 281 for engagement of the finger 282 at its upper end with the outer end 253 of lever 249. Relating this action to Fig. 16, bar 281 moves upward from its lowered position shown therein to the point where finger 282 engages the bottom of the outer end 253 of lever 249. This keeps the lever 249 from rotating counterclockwise as viewed in Fig. 16 (clockwise as viewed in Fig. 21) away from its operative position. Thus, the pusher 235 is kept from rotating counterclockwise on its pivot 237 as viewed in Fig. 21. Accordingly, the lower arm 239 of the pusher engages and pushes the nickel N–1 toward the left as viewed in Fig. 21, and the nickel engages the arm 111 and swings the hinge member 87 and the stop 85 counterclockwise as viewed in Figs. 9 and 11–13 to move the stop to retracted position clear of the lever 63. This occurs before the lever 63 has swung far enough to engage the stop and before the pawl 77 latches on to the teeth 75 and before the outer end 253 of lever 249, moving with the coin receiver 155, rides off the finger 282. With the stop 85 retracted from the path of lever 63 before the lever reaches the stop, the rod 23 may be completely pulled out, and then returned to its retracted position to obtain the desired five-cent item. When the coin receiver 155 has moved rearward a sufficient distance for the nickel to have pushed the arm 11 out of the way, the nickel is kicked off finger 255 by the pusher 235 returning to its retracted position. This kicking action is such that the nickel falls out of the receiver 155 into the nickel magazine 135 provided the magazine is not full of nickels. If the magazine is full, the nickel is diverted to the chute 137 for passage to the coin box 139. It will be observed that the raising of the bar 281 under the above-described circumstances results solely from the operation of the crank 291. While this raises stud 301 from lever arm 275, lever 271 cannot swing clockwise as viewed in Figs. 15 and 16 because of the engagement of its finger 277 with arm 119 (which remains fixed as arm 111 is moved by the nickel). Accordingly, the cam 309 simply passes over the cam follower roll 279 as the coin receiver 155 moves rearward. Hence, bar 281 is not raised far enough to operate the gate 313.

Assuming that one nickel is deposited as above described and that a ten-cent selector rod 23 (such as one of the two inner rods as shown in Fig. 1) is pulled, the action is such that the stop 85 is not retracted to allow lever 63 to complete movement as above described. This lock-out upon pulling a ten-cent rod 23 when only a nickel has been deposited in the machine occurs as follows: When a ten-cent rod 23 is pulled outward, the shaft 289 remains in its normal position, inasmuch as the roller 297 on the ten-cent rod does not engage any arm 298. The result is that the bar 281 is not raised at all. Thus, there is no restraint upon the outer end 253 of lever 249 moving downward, and lever 249 remains free for clockwise rotation from its operative position shown in Fig. 21. Under these circumstances, as the coin receiver 155 begins its rearward movement, the pusher 235 is free for counterclockwise displacement on its pivot 237 from its operative position shown in Fig. 21 with the result that it is simply displaced by the nickel N-1 and no force is brought to bear through the nickel upon the arm 111. Thus, the stop 85 is not swung to retracted position before it is engaged by the upper end of the lever 63, and outward movement of the ten-cent rod 23 is limited to a partial stroke, insufficient to operate the dispensing mechanism.

Assuming now that a dime D-1 is deposited for the purchase of a ten-cent item, the dime is delivered to the dime chute 164 of the coin receiver 155. It rolls down this chute, is intercepted by deflector 166, and comes to rest in position A (Fig. 23) on dime support 173 with its rearward edge engaging the arm 119 and its forward edge engaged by the arm 172 of the deflector. Now, when a ten-cent rod 23 is pulled out, thereby moving the coin receiver 155 rearward, the dime is moved rearward by the deflector to swing the arm 119 rearward, thereby rotating the rod 89 to swing the stop 85 (via stud 115) to a position clearing the upper end 83 of the lever 63. This occurs before lever 63 engages the stop. Accordingly, lever 63 is allowed to complete its stroke and the ten-cent rod 23 may be pulled completely out and then allowed to return to its retracted position to dispense the ten-cent item. When the coin receiver has moved rearward to the point where the dime has pushed the arm 119 out of the way, the dime is kicked off support 173 by the deflector 166 returning to its normal position of Fig. 22. This kicking action is such that the dime strikes a bounce 341 and falls out of the receiver 155 into chute 147 for delivery to the coin box. Since shaft 289 is not rotated and bar 281 is not raised under these circumstances, the outer end of the arm 275 of the bell crank lever 271 is not raised, again the cam 309 simply passes over the roll 279, and no change is issued.

Assuming that a dime is deposited for the purchase of a five-cent item, the dime is delivered to the chute 164 and the dime comes to rest as before, in position A on support 173. Upon pulling out a five-cent selector rod 23, the action is similar to that occurring upon pulling out the ten-cent rod as previously described, with the exception that now the shaft 289 is rocked to raise the bar 281. This raises stud 301 from the arm 275 of the lever 271, and permits arm 275 to raise under the bias of spring 199, noting that the dime is pushing arm 119 in the direction away from the finger 277 at the upper end of arm 273 of lever 271 to allow the lever to rock. Finger 277 follows arm 119 as the latter swings rearward. The outer end of arm 275 and the roller 279 thereon are now raised to the point where cam 309, moving rearward with the coin receiver 155, engages under the roll 279, thereby imparting to bar 281 additional upward movement (added to that imparted by crank 291) to the extent required for finger 317 at the lower end of the bar to operate the gate 313 to release a nickel in change from the nickel magazine 135.

Assuming that two nickels N-1 and N-2 are deposited for the purchase of a ten-cent item, the nickels are delivered to the nickel chute 175 of the coin receiver and the nickels fall to the positions B and C shown in Fig. 21. The pusher 235 takes its operative position shown in solid lines in Fig. 21 and is locked against rocking on its pivot in either direction by the two nickels. Accordingly, when a ten-cent rod 23 is pulled out, and the coin receiver is thereby moved rearward, the pusher 235 acts through the two nickels to swing arms 109 and 111 rearward thereby to rotate stop 85 from the path of the upper end 83 of the lever 63 before 83 engages the stop. Thus, lever 63 is allowed to complete its stroke and the ten-cent rod 23 may be fully pulled out and returned to dispense the ten-cent item. Here again, the rod 281 is not raised, and the cam 309 simply passes over the top of roll 279, so that no change is issued.

If a purchaser wishes to obtain the return of any deposited coins, he may do so by operating a suitable means incorporated in the vending machine for pushing down the coin return bar 221. As previously explained, this drives the dime support 173 and the cam 217 rearward, so that any deposited coins will be returned via chute 325 to the trough 5.

Assuming that no coin whatsoever is deposited in the apparatus, and an attempt is made to pull out any one of the selector rods 23, the stop 85 is not retracted, and the rod cannot be pulled out any farther than the small distance corresponding to the small angle through which lever 63 may turn before its shoulder 83 engages the shoulder 107 of the stop. This is because of the requirement for the presence of either a dime in the coin receiver to act as a link between the deflector 166 and the arm 119, or the presence of at least one nickel N-1 in the coin receiver to act as a link between the pusher 235 and the arm 111. Without a coin in the coin receiver, rearward movement of the coin receiver through the limited distance permitted before the lever 63 engages the stop 85 has no effect to swing any one of the arms 109, 111, 119.

It will be observed that, in essence, the pusher 235 is mounted both for pushing movement, i. e., linear horizontal movement in the plane of the nickels N-1 and N-2, and also for displacement by the nickel N-1 without pushing it, displacement occurring by rocking of the pusher on its pivot 237. The pusher 235 is adapted to be held against such displacement in either of two ways: by a second nickel N-2, when present; and in the absence of a second nickel by the mechanical linkage comprising shaft 289, crank 291, stud 293, bar 281, finger 282 at the upper end of the bar 281 and lever 249, this linkage constituting means operable in the absence of a second nickel for holding the pusher against rocking displacement to condition it for pushing a first nickel N-1. The coin receiver 155 constitutes a means for holding coins in position for being pushed.

The stop 323 extends into the enlarged forward end of the forward keyhole slot 181, being removably held on a bolt 129 by a wing nut 343. By removing the stop 323, the entire coin receiver 155 can be removed simply by moving it forward to the point where the studs 179 register with the enlarged forward ends of keyhole slots 181 and where stud 182 registers with the enlarged forward end of the keyhole slot 183.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. Apparatus for controlling the operation of a vending machine for vending a first class of items upon deposit of a first coin of a first denomination, for vending a second class of items either upon deposit of a second coin of said first denomination in addition to the first coin or upon deposit of a coin of a second denomination having twice the value of the first, and also for vending an item of the first class upon deposit of a coin of the second denomination and issuing a coin of the first denomination in change, said machine having a first selector operable to obtain an item of the first class and a second selector operable to obtain an item of the second class, said apparatus comprising means including a stop movable between a position for holding the selectors against operation to obtain any item and a retracted position, a movable coin receiver having a first chute for coins of the first denomination and a second chute for coins of the second denomination, means for moving the coin receiver away from and back to a retracted position upon operation of either selector, means for holding coins in the chutes in the receiver, a first coin pusher displaceably mounted in the first chute of the receiver and adapted when held against displacement relative to the receiver to push coins of the first denomination along with the receiver, said first coin pusher being adapted for displacement relative to the receiver if there is only one coin of the first denomination in the first chute, but being held against such displacement by a second coin of the first denomination in the first chute, a second coin pusher in the second chute of the receiver for pushing a coin of the second denomination therein along with the receiver, first means engageable by a coin of the first denomination moving along with the receiver for moving the stop to retracted position, second means engageable by a coin of the second denomination moving along with the receiver for moving the stop to retracted position, said first and second stop moving means being operable independently of the second stop-moving means, means including a member shiftable a predetermined amount by the first selector for holding the first coin pusher against displacement when there is only one coin of the first denomination in the first chute, means for holding a supply of coins of the first denomination to be issued in change, said member being further shiftable for issuing a coin in change from said coin holding means, and means for imparting such further shifting movement to said member in response to operation of the first selector and the operation of said second stop-moving means.

2. Apparatus as set forth in claim 1 wherein the means for imparting the further shifting movement to said member comprises a lever normally held in a retracted position by said second stop-moving means and movable to an operative position upon movement of said second stop-moving means by a coin in the second chute, a cam movable with the coin receiver, and a cam follower on said lever movable into a position for engagement by the cam upon movement of the lever to operative position.

3. Apparatus for controlling the operation of a vending machine for vending five-cent items upon deposit of a nickel, for vending ten-cent items either upon deposit of a second nickel in addition to the first nickel or upon deposit of a dime, and also for vending a five-cent item upon deposit of a dime and issuing a nickel in change, said machine having a first selector operable to obtain a five-cent item and a second selector operable to obtain a ten-cent item, said apparatus comprising means including a stop movable between a position for holding the selectors against operation to obtain any item and a retracted position, a movable coin receiver having a nickel chute and a dime chute, means for moving the coin receiver away from and back to a retracted position upon operation of either selector, means for holding coins in the chutes in the receiver, a nickel pusher displaceably mounted in the nickel chute and adapted when held against displacement relative to the receiver to push nickels along with the receiver, said nickel pusher being adapted for displacement relative to the receiver if there is only one nickel in the nickel chute, but being held against such displacement by a second nickel in the nickel chute, a dime pusher in the dime chute for pushing a dime therein along with the receiver, first means engageable by a nickel moving along with the receiver for moving the stop to retracted position, second means engageable by a dime moving along with the receiver for moving the stop to retracted position, said first stop-moving means being operable independently of the second stop-moving means, means including a member shiftable a predetermined amount by the first selector for holding the nickel pusher against displacement when there is only one nickel in the nickel chute, means for holding a supply of nickels to be issued in change, said member being further shiftable for issuing a nickel in change from said nickel holding means, and means for imparting such further shifting movement to said member in response to operation of the first selector and the operation of said second stop-moving means.

4. Apparatus as set forth in claim 3 wherein the means for imparting the further shifting movement to said member comprises a lever normally held in a retracted position by said second stop-moving means and movable to an operative position upon movement of said second stop-moving means by a dime in the dime chute, a cam movable with the coin receiver, and a cam follower on said lever movable into a position for engagement by the cam upon movement of the lever to operative position.

5. Apparatus for controlling the operation of a vending machine for vending a first class of items upon deposit of a first coin of a first denomination, for vending a second class of items either upon deposit of a second coin of said first denomination in addition to the first coin or upon deposit of a coin of a second denomination having twice the value of the first, and also for vending an item of the first class upon deposit of a coin of the second denomination and issuing a coin of the first denomination in change, said machine having a first selector requiring full-stroke operation for obtaining an item of the class and a second selector requiring full-stroke operation for obtaining an item of the second class, said apparatus comprising means including a stop movable from an operative position, in which it limits the operation of both selectors to less than full stroke insufficient to obtain any item, to a retracted position allowing full-stroke operation of a selector, a slidable coin receiver having a first chute for coins of the first denomination and a second chute for coins of the second denomination, means for sliding the coin receiver away from and back to a retracted position upon operation of either selector, means for holding coins in the chutes in the receiver, a rocker pivotally mounted in the first chute of the receiver and adapted when held against rocking to push coins of the first denomination along with the receiver, said rocker being adapted to rock on its pivot if there is only one coin of the first denomination in the first chute, but being held against rocking by a second coin of the first denomination in the first chute, means in the second chute for pushing a coin of the second denomination therein along with the receiver, first means engageable by a coin of the first denomination moving along with the receiver for moving the stop to retracted position, second means engageable by a coin of the second denomination moving along with the receiver for moving the stop to retracted position, said first stop-moving means being operable independently of the second stop-moving means, means including a member shiftable a predetermined amount by the first selector for holding the rocker against rocking when there is only one coin of the first denomination in the first chute, means for holding a supply of coins of the first denomination to be issued in change, said member being further shiftable for issuing a coin in change from said coin holding means, and means for imparting such further shifting movement to said member in response to operation of the first selector and the operation of said second stop-moving means.

6. Apparatus as set forth in claim 5 wherein the means for holding the rocker against rocking comprises a holding lever pivoted on the receiver, said member comprising a shiftable bar operable on the holding lever and shiftable from a retracted position to an operative holding position by the first selector, and wherein the bar is further shiftable for issuing a coin in change by means comprising a shifting lever normally held in a retracted position by the bar and by said second stop-moving means, said shifting lever being movable to an operative position upon movement of the bar to pusher-holding position and movement of said second stop-moving means by a coin in the second chute, said lever carrying a cam follower, and a cam movable with the receiver and adapted for engagement with the cam follower when the shifting lever is moved to its said operative position, the cam acting upon continued movement of the receiver to rock the shifting lever and effect said further shifting of the bar.

7. Apparatus for controlling the operation of a vending machine for vending five-cent items upon deposit of a nickel, for vending ten-cent items either upon deposit of a second nickel in addition to the first nickel or upon deposit of a dime, and also for vending a five-cent item upon deposit of a dime and issuing a nickel in change, said machine having a first selector requiring full-stroke operation for obtaining a five-cent item and a second selector requiring full-stroke operation for obtaining a ten-cent item, said apparatus comprising means including a stop movable from an operative position, in which it limits the operation of both selectors to less than full stroke insufficient to obtain any item, to a retracted position allowing full-stoke operation of a selector, a slidable coin receiver having a nickel chute and a dime chute, means for sliding the coin receiver away from and back to a retracted position upon operation of either selector, means for holding coins in the chutes in the receiver, a rocker pivotally mounted in the nickel chut and adapted when held against rocking to push nickels along with the receiver, said rocker being adapted to rock on its pivot if there is only one nickel in the nickel chute, but being held against rocking by a second nickel in the nickel chute, a dime pusher in the dime chute for pushing a dime therein along with the receiver, first means engageable by a nickel moving along with the receiver for moving the stop to retracted position, second means engageable by a dime moving along with the receiver for moving the stop to retracted position, said first stop-moving means being operable independently of the second stop-moving means, means including a member shiftable a predetermined amount by the first selector for holding the rocker against rocking when there is only one nickel in the nickel chute, means for holding a supply of nickels to be issued in change, said member being further shiftable for issuing a nickel in change from said nickel holding means, and means for imparting such further shifting movement to said member in response to operation of the first selector and the operation of said second stop-moving means.

8. Apparatus as set forth in claim 7 wherein the means for holding the rocker against rocking comprises a holding lever pivoted on the receiver, said member comprising a shiftable bar operable on the holding lever and shiftable from a retracted position to an operative holding position by the first selector, and wherein the bar is further shiftable for issuing a nickel in change by means comprising a shifting lever normally held in a retracted position by the bar and by said second stop-moving means, said shifting lever being movable to an operative position upon movement of the bar to pusher-holding position and movement of said second stop-moving means by a coin in the second chute, said lever carrying a cam follower, and a cam movable with the receiver and adapted for engagement with the cam follower when the shifting lever is moved to its said operative position, the cam acting upon continued movement of the receiver to rock the shifting lever and effect said further shifting of the bar.

References Cited in the file of this patent

UNITED STATES PATENTS

| 387,103 | Osterberg | July 31, 1888 |
| 1,634,679 | Nixon | July 5, 1927 |
| 2,037,462 | Du Grenier | Apr. 14, 1936 |
| 2,279,665 | Du Grenier | Apr. 14, 1942 |
| 2,453,398 | Auerbach | Nov. 9, 1948 |
| 2,655,244 | Stoner | Oct. 13, 1953 |

FOREIGN PATENTS

| 48,360 | Denmark | Feb. 5, 1934 |

UNITED STATES PATENT OFFICE
CERTIFICATE OF CORRECTION

Patent No. 2,858,921            November 4, 1958

Benjamin W. Fry

It is hereby certified that error appears in the printed specification of the above numbered patent requiring correction and that the said Letters Patent should read as corrected below.

Column 13, line 45, for "position, said first and second stop moving means being" read -- position, said first stop moving means being --; column 14, line 51, for "the class" read -- the first class --; column 15, line 50, for "chut" read -- chute --.

Signed and sealed this 3rd day of March 1959.

(SEAL)
Attest:

KARL H. AXLINE

Attesting Officer

ROBERT C. WATSON
                                         Commissioner of Patents